US009720072B2

(12) United States Patent
McCloskey et al.

(10) Patent No.: US 9,720,072 B2
(45) Date of Patent: Aug. 1, 2017

(54) METHODS AND SYSTEMS FOR VEHICLE RADAR COORDINATION AND INTERFERENCE REDUCTION

(71) Applicant: Waymo LLC, Mountain View, CA (US)

(72) Inventors: Edward Daniel McCloskey, San Jose, CA (US); Russell Leigh Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 336 days.

(21) Appl. No.: 14/494,173

(22) Filed: Sep. 23, 2014

(65) Prior Publication Data
US 2016/0061935 A1 Mar. 3, 2016

Related U.S. Application Data

(60) Provisional application No. 62/043,301, filed on Aug. 28, 2014.

(51) Int. Cl.
G01S 13/93 (2006.01)
G01S 7/02 (2006.01)
G01S 13/34 (2006.01)

(52) U.S. Cl.
CPC ............ G01S 7/023 (2013.01); G01S 13/931 (2013.01); G01S 13/343 (2013.01)

(58) Field of Classification Search
CPC ....... G01S 7/023; G01S 13/931; G01S 13/343
USPC ...... 342/82, 70–72, 174; 340/435, 436, 903; 701/301
See application file for complete search history.

(56) References Cited

U.S. PATENT DOCUMENTS 3,778,828 A * 12/1973 McFarland ............. G01S 13/64
  327/91
6,094,160 A * 7/2000 Lajiness .................. G01S 7/023
  342/159
6,151,539 A 11/2000 Bergholz et al.
6,292,725 B1 9/2001 Kageyama et al.
(Continued)

FOREIGN PATENT DOCUMENTS

JP 2000028713 A * 1/2000
WO WO 2016032780 A1 * 3/2016 ............. G01S 7/023

OTHER PUBLICATIONS

International Search Report and Written Opinion of corresponding International Application No. PCT/US2015/045435 (mailed Nov. 19, 2015).

Primary Examiner — John B Sotomayor
(74) Attorney, Agent, or Firm — McDonnell Boehnen Hulbert & Berghoff LLP

(57) ABSTRACT

A method is provided that includes a vehicle receiving data from an external computing device indicative of at least one other vehicle in an environment of the vehicle. The vehicle may include a sensor configured to detect the environment of the vehicle. The at least one other vehicle may include at least one sensor. The method also includes determining a likelihood of interference between the at least one sensor of the at least one other vehicle the sensor of the vehicle. The method also includes initiating an adjustment of the sensor to reduce the likelihood of interference between the sensor of the vehicle and the at least one sensor of the at least one other vehicle responsive to the determination.

20 Claims, 11 Drawing Sheets

(56) References Cited

U.S. PATENT DOCUMENTS

| | | | |
|---|---|---|---|
| 6,535,114 B1 * | 3/2003 | Suzuki | G06T 7/20 |
| | | | 340/435 |
| 6,708,100 B2 | 3/2004 | Russell et al. | |
| 8,095,313 B1 | 1/2012 | Blackburn | |
| 8,380,154 B2 * | 2/2013 | Lindqvist | H04B 7/0854 |
| | | | 375/316 |
| 8,571,742 B2 | 10/2013 | Takeoka | |
| 8,706,394 B2 | 4/2014 | Trepagnier et al. | |
| 8,717,156 B2 | 5/2014 | Tronnier et al. | |
| 8,751,157 B2 | 6/2014 | Simon | |
| 2003/0151541 A1 * | 8/2003 | Oswald | B60R 21/01538 |
| | | | 342/70 |
| 2007/0120731 A1 | 5/2007 | Kelly, Jr. et al. | |
| 2007/0200747 A1 | 8/2007 | Okai et al. | |
| 2008/0036645 A1 * | 2/2008 | Yamano | G01S 7/023 |
| | | | 342/109 |
| 2008/0122679 A1 * | 5/2008 | Noda | G01S 7/354 |
| | | | 342/104 |
| 2009/0096661 A1 | 4/2009 | Sakamoto | |
| 2009/0278709 A1 * | 11/2009 | Endo | B62D 15/027 |
| | | | 340/932.2 |
| 2010/0019950 A1 * | 1/2010 | Yamano | G01S 7/023 |
| | | | 342/104 |
| 2011/0291875 A1 * | 12/2011 | Szajnowski | G01S 7/023 |
| | | | 342/70 |
| 2012/0068881 A1 * | 3/2012 | Abatzoglou | G01S 13/9035 |
| | | | 342/90 |
| 2012/0268316 A1 * | 10/2012 | Kanamoto | G01S 3/74 |
| | | | 342/158 |
| 2016/0061935 A1 * | 3/2016 | McCloskey | G01S 7/023 |
| | | | 342/82 |

* cited by examiner

METHODS AND SYSTEMS FOR VEHICLE RADAR COORDINATION AND INTERFERENCE REDUCTION

CROSS-REFERENCE TO RELATED APPLICATION

This application claims priority to U.S. Provisional Patent Application Ser. No. 62/043,301, filed on Aug. 28, 2014, the entirety of which is herein incorporated by reference.

BACKGROUND

Unless otherwise indicated herein, the materials described in this section are not prior art to the claims in this application and are not admitted to be prior art by inclusion in this section.

Radio detection and ranging (RADAR) systems can be used to actively estimate range, angle, and/or Doppler frequency shift to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some examples, directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. The radar sensor can thus be used, for instance, by an autonomous vehicle control system to avoid obstacles indicated by the sensor information.

Some example automotive radar systems may be configured to operate at an electromagnetic wave frequency range of 76-77 Giga-Hertz (GHz). These radar systems may use transmission antennas that can to focus the radiated energy into tight beams in order to enable receiving antennas (e.g., having wide angle beams) in the radar system to measure an environment of the vehicle with high accuracy.

SUMMARY

In one example, a vehicle is provided that includes a sensor configured to detect an environment of the vehicle based on a comparison between electromagnetic (EM) radiation transmitted by the sensor and a reflection of the EM radiation from one or more objects in the environment of the vehicle. The vehicle may also include a controller configured to receive data from an external computing device indicative of at least one other vehicle in the environment of the vehicle. The at least one other vehicle may include at least one sensor. The controller may also be configured to determine a likelihood of interference between the at least one sensor of the at least one other vehicle and the sensor of the vehicle based on the data. The controller may also be configured to responsively initiate an adjustment of the sensor to reduce the likelihood of interference between the sensor of the vehicle and the at least one sensor of the at least one other vehicle.

In another example, a method is provided that comprises a vehicle receiving data from an external computing device indicative of at least one other vehicle in an environment of the vehicle. The at least one other vehicle may include at least one sensor. The vehicle may include a sensor configured to detect the environment of the vehicle based on a comparison between electromagnetic (EM) radiation transmitted by the sensor and a reflection of the EM radiation from one or more objects in the environment of the vehicle. The method further comprises determining a likelihood of interference between the at least one sensor of the at least one other vehicle and the sensor of the vehicle based on the data. The method further comprises initiating an adjustment of the sensor based on the likelihood being greater than a threshold likelihood. The adjustment may reduce the likelihood of interference between the sensor of the vehicle and the at least one sensor of the at least one other vehicle.

In yet another example, a method is provided that comprises receiving data from a plurality of vehicles by a computing device that includes one or more processors. The data may be indicative of configuration parameters of sensors in the plurality of vehicles. The data may also be indicative of locations of the plurality of vehicles. A given sensor of a given vehicle may be configured to detect an environment of the given vehicle based on a comparison between electromagnetic (EM) radiation transmitted by the given sensor and a reflection of the EM radiation from one or more objects in the environment of the given vehicle. The method further comprises determining that the given vehicle is within a threshold distance to at least one other vehicle based on the data. The method further comprises responsively determining a likelihood of interference between at least one sensor of the at least one other vehicle and the given sensor of the given vehicle based on the configuration parameters. The method further comprises the computing device providing a request to the given vehicle to adjust given configuration parameters of the given sensor to reduce the likelihood of interference between the given sensor of the given vehicle and the at least one sensor of the at least one other vehicle. The provision of the request may be based on the likelihood being greater than a threshold likelihood.

In still another example, a system is provided that comprises a means for a vehicle receiving data from an external computing device indicative of at least one other vehicle in an environment of the vehicle. The at least one other vehicle may include at least one sensor. The vehicle may include a sensor configured to detect the environment of the vehicle based on a comparison between electromagnetic (EM) radiation transmitted by the sensor and a reflection of the EM radiation from one or more objects in the environment of the vehicle. The system further comprises a means for determining that a likelihood of interference between the at least one sensor of the at least one other vehicle and the sensor of the vehicle based on the data. The system further comprises a means for initiating an adjustment of the sensor based on the likelihood being greater than a threshold likelihood. The adjustment may reduce the likelihood of interference between the sensor of the vehicle and the at least one sensor of the at least one other vehicle.

In still another example, a system is provided that comprises a means for receiving data from a plurality of vehicles by a computing device that includes one or more processors. The data may be indicative of configuration parameters of sensors in the plurality of vehicles. The data may also be indicative of locations of the plurality of vehicles. A given sensor of a given vehicle may be configured to detect an environment of the given vehicle based on a comparison between electromagnetic (EM) radiation transmitted by the given sensor and a reflection of the EM radiation from one or more objects in the environment of the given vehicle. The system further comprises a means for determining that the given vehicle is within a threshold distance to at least one other vehicle based on the data. The system further comprises a means for responsively determining a likelihood of interference between at least one sensor of the at least one other vehicle and the given sensor of the given vehicle based on the configuration parameters. The system further comprises a means for the computing device providing a request to the given vehicle to adjust given configuration parameters of the given sensor to reduce the likelihood of interference between the given sensor of the given vehicle and the at least one sensor of the at least one other vehicle. The provision of the request may be based on the likelihood being greater than a threshold likelihood.

These as well as other aspects, advantages, and alternatives, will become apparent to those of ordinary skill in the art by reading the following detailed description, with reference where appropriate to the accompanying figures.

DETAILED DESCRIPTION

Figure 1:
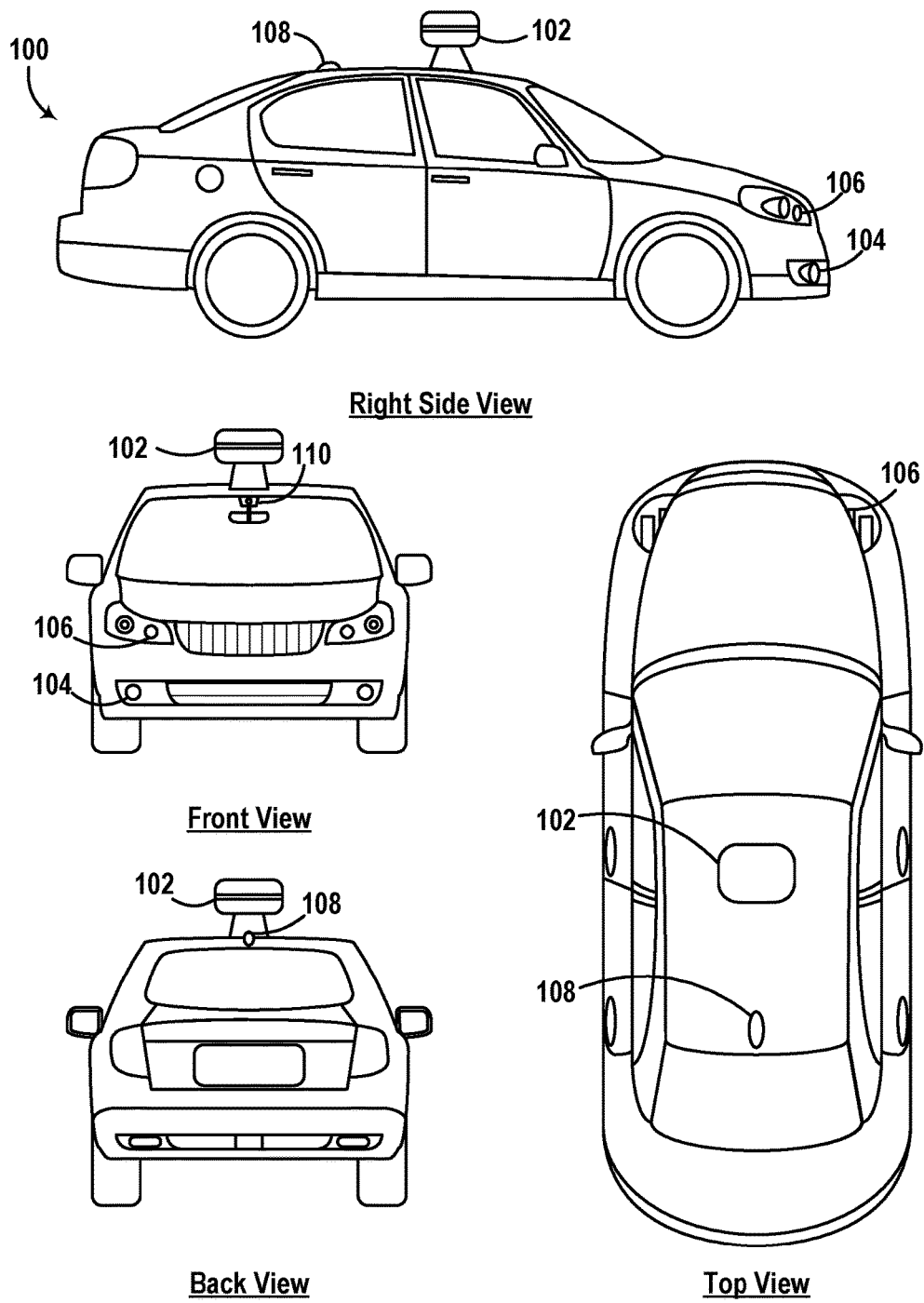
FIG. 1 illustrates a vehicle, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

There are continued efforts to improve vehicle safety, including the development of autonomous vehicles equipped with accident-avoidance systems that may have the ability to avoid accidents. Various sensors, such as radio detection and ranging (RADAR) sensors and light detection and ranging (LIDAR) sensors among other possibilities, may be included in an autonomous vehicle to detect obstacles and/or other vehicles in an environment of the autonomous vehicle and thereby facilitate accident avoidance. However, as more vehicles adopt such accident-avoidance systems and the density of sensor equipped vehicles increases, interference between the sensors may reduce accuracy and effectiveness of the sensors for use in accident avoidance.

Within examples, systems and methods herein may be configured to adjust a sensor of a vehicle to reduce a likelihood of interference between the sensor and other sensors of other vehicles. By way of example, a vehicle herein may comprise a sensor configured to detect an environment of the vehicle. The vehicle may further comprise a controller configured to receive data from an external computing device indicative of at least one other vehicle in the environment of the vehicle. The external computing device, for example, may be a server in wireless communication with the vehicle and other vehicles in the environment. In one instance, the controller may also be configured to determine that the at least one sensor of the at least one other vehicle is directed towards the sensor of the vehicle based on the data. In another instance, the controller may be configured to determine that the vehicle and the at least one other vehicle are within a threshold distance to each other, thus increasing the likelihood of interference. Thus, for example, the data may include locations of the at least one other vehicle and/or directions of the at least one sensor. The controller may also be configured to responsively initiate an adjustment of the sensor to reduce the likelihood of interference between the sensor of the vehicle and the at least one sensor of the at least one other vehicle.

Various adjustments of the sensor are possible such as adjusting a direction, power, modulation pattern, or any other parameter of the sensor to reduce interference with the at least one sensor of the at least one other vehicle.

Alternatively, in some examples, the external computing device may receive configuration parameters of the sensor of the vehicle and other sensors of other vehicles in the vicinity of the vehicle. In these examples, the external computing device may provide instructions to the vehicle and/or the other vehicles with suitable adjustments for corresponding sensors to reduce the interference between the various sensors. Therefore, in some embodiments, some of the functions described above for the vehicle may be alternatively performed by the external computing device in accordance with various conditions such as network latency between the external computing device and the vehicle or other safety considerations.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

Referring now to the Figures, FIG. 1 illustrates a vehicle 100, according to an example embodiment. In particular, FIG. 1 shows a Right Side View, Front View, Back View, and Top View of the vehicle 100. Although vehicle 100 is illustrated in FIG. 1 as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting.

As shown, the vehicle 100 includes a first sensor unit 102, a second sensor unit 104, a third sensor unit 106, a wireless communication system 108, and a camera 110. Each of the first, second, and third sensor units 102-106 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 102-106 are shown to be mounted in particular locations on the vehicle 100, in some embodiments the sensor units 102-106 may be mounted elsewhere on the vehicle 100, either inside or outside the vehicle 100. For example, a sensor unit may be mounted at the back of the vehicle (not shown in FIG. 1). Further, while only three sensor units are shown, in some embodiments more or fewer sensor units may be included in the vehicle 100.

In some embodiments, one or more of the first, second, and third sensor units 102-106 may include one or more movable mounts (e.g., "steering devices") on which the sensors may be movably mounted. The movable mount may include, for example, a rotating platform. Sensors mounted on the rotating platform could be rotated so that the sensors may obtain information from various direction around the vehicle 100. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 102-106 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 108 may be any system configured to wirelessly couple to one or more other vehicles, sensors, or other entities, either directly or via a communication network. To this end, the wireless communication system 108 may include an antenna and a chipset for communicating with the other vehicles, sensors, servers, or other entities either directly or via a communication network. The chipset or wireless communication system 108 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 108 may take other forms as well.

While the wireless communication system 108 is shown positioned on a roof of the vehicle 100, in other embodiments the wireless communication system 108 could be located, fully or in part, elsewhere.

The camera 110 may be any camera (e.g., a still camera, a video camera, etc.) configured to capture images of the environment in which the vehicle 100 is located. To this end, the camera 110 may be configured to detect visible light, or may be configured to detect light from other portions of the spectrum, such as infrared or ultraviolet light. Other types of cameras are possible as well. The camera 110 may be a two-dimensional detector, or may have a three-dimensional spatial range. In some embodiments, the camera 110 may be, for example, a range detector configured to generate a two-dimensional image indicating a distance from the camera 110 to a number of points in the environment. To this end, the camera 110 may use one or more range detecting techniques. For example, the camera 110 may use a structured light technique in which the vehicle 100 illuminates an object in the environment with a predetermined light pattern, such as a grid or checkerboard pattern and uses the camera 110 to detect a reflection of the predetermined light pattern off the object. Based on distortions in the reflected light pattern, the vehicle 100 may determine the distance to the points on the object. The predetermined light pattern may comprise infrared light, or light of another wavelength. As another example, the camera 110 may use a laser scanning technique in which the vehicle 100 emits a laser and scans across a number of points on an object in the environment. While scanning the object, the vehicle 100 uses the camera 110 to detect a reflection of the laser off the object for each point. Based on a length of time it takes the laser to reflect off the object at each point, the vehicle 100 may determine the distance to the points on the object. As yet another example, the camera 110 may use a time-of-flight technique in which the vehicle 100 emits a light pulse and uses the camera 110 to detect a reflection of the light pulse off an object at a number of points on the object. In particular, the camera 110 may include a number of pixels, and each pixel may detect the reflection of the light pulse from a point on the object. Based on a length of time it takes the light pulse to reflect off the object at each point, the vehicle 100 may determine the distance to the points on the object. The light pulse may be a laser pulse. Other range detecting techniques are possible as well, including stereo triangulation, sheet-of-light triangulation, interferometry, and coded aperture techniques, among others. The camera 110 may take other forms as well.

In some embodiments, the camera 110 may include a movable mount and/or an actuator, as described above, that are configured to adjust the position and/or orientation of the camera 110 by moving the camera 110 and/or the movable mount.

While the camera 110 is shown to be mounted inside a front windshield of the vehicle 100, in other embodiments the camera 110 may be mounted elsewhere on the vehicle 100, either inside or outside the vehicle 100.

The vehicle 100 may include one or more other components in addition to or instead of those shown.

Figure 2:
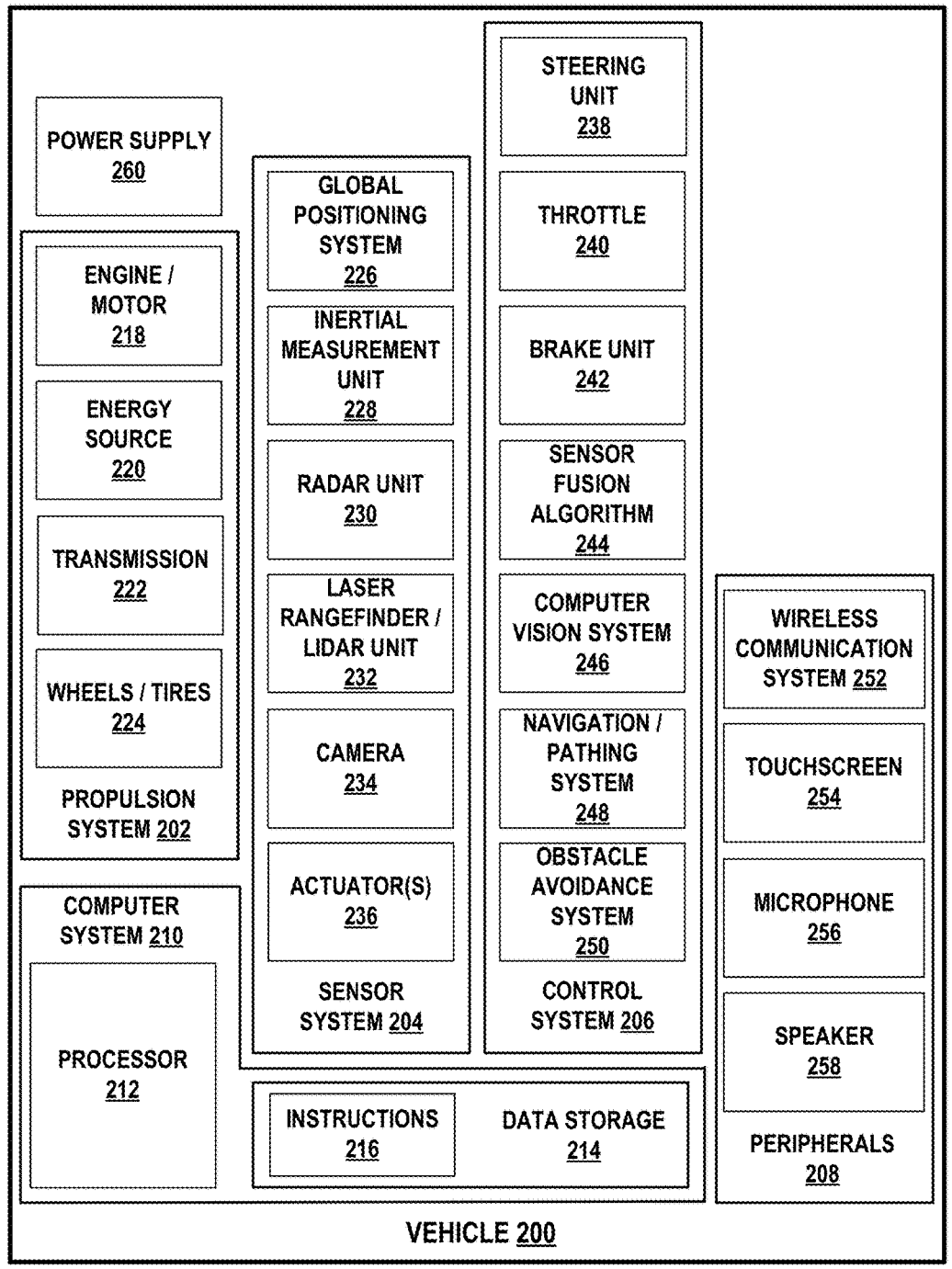
FIG. 2 is a simplified block diagram of a vehicle, according to an example embodiment.

FIG. 2 is a simplified block diagram of a vehicle 200, according to an example embodiment. The vehicle 200 may be similar to the vehicle 100 described above in connection with FIG. 1, for example. However, the vehicle 200 may take other forms as well.

As shown, the vehicle 200 includes a propulsion system 202, a sensor system 204, a control system 206, peripherals 208, and a computer system 210 including a processor 212, data storage 214, and instructions 216. In other embodiments, the vehicle 200 may include more, fewer, or different systems, and each system may include more, fewer, or different components. Additionally, the systems and components shown may be combined or divided in any number of ways.

The propulsion system 202 may be configured to provide powered motion for the vehicle 200. As shown, the propulsion system 202 includes an engine/motor 218, an energy source 220, a transmission 222, and wheels/tires 224.

The engine/motor 218 may be or include any combination of an internal combustion engine, an electric motor, a steam engine, and a Stirling engine. Other motors and engines are possible as well. In some embodiments, the propulsion system 202 could include multiple types of engines and/or motors. For instance, a gas-electric hybrid car could include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 could additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts could include one or more axles that are configured to be coupled to the wheels/tires 224.

The wheels/tires 224 of vehicle 200 could be configured in various formats, including a unicycle, bicycle/motorcycle, tricycle, or car/truck four-wheel format. Other wheel/tire formats are possible as well, such as those including six or more wheels. In any case, the wheels/tires 224 of vehicle 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials. The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include a Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.). Other sensors are possible as well.

The GPS 226 may be any sensor (e.g., location sensor) configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR 230 unit may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode.

The camera 234 may be any camera (e.g., a still camera, a video camera, etc.) configured to capture images of the environment in which the vehicle 200 is located. To this end, the camera may take any of the forms described above. The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200.

The throttle 240 may be any combination of mechanisms configured to control the operating speed of the engine/motor 218 and, in turn, the speed of the vehicle 200.

The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, or another algorithm. The sensor fusion algorithm 244 may further be configured to provide various assessments based on the data from the sensor system 204, including, for example, evaluations of individual objects and/or features in the environment in which the vehicle 200 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located. The control system 206 may additionally or alternatively include components other than those shown.

Peripherals 208 may be configured to allow the vehicle 200 to interact with external sensors, other vehicles, and/or a user. To this end, the peripherals 208 may include, for example, a wireless communication system 252, a touchscreen 254, a microphone 256, and/or a speaker 258.

The wireless communication system 252 may take any of the forms described above similarly to the wireless communication system 108 of the vehicle 100.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200. The peripherals 208 may additionally or alternatively include components other than those shown.

The computer system 210 may be configured to transmit data to and receive data from one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

The computer system 210 may be further configured to interact with and control one or more components of the propulsion system 202, the sensor system 204, the control system 206, and/or the peripherals 208. For example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be config-
ured to store and execute instructions for displaying a display on the touchscreen 254. As still another example, the computer system 110 may be configured to adjust the radar unit 230 (e.g., adjust direction, power, modulation pattern, etc.). Other examples are possible as well.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions. Data storage 214 may contain additional instructions as well, including instructions to transmit data to, receive data from, interact with, and/or control one or more of the propulsion system 202, the sensor system 204, the control system 206, and the peripherals 208. The computer system 210 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together, as in some all-electric cars.

In some embodiments, one or more of the propulsion system 202, the sensor system 204, the control system 206, and the peripherals 208 could be configured to work in an interconnected fashion with other components within and/or outside their respective systems.

Further, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while each of the components and systems are shown to be integrated in the vehicle 200, in some embodiments, one or more components or systems may be removably mounted on or otherwise connected (mechanically or electrically) to the vehicle 200 using wired or wireless connections. The vehicle 200 may take other forms as well.

Figure 3:
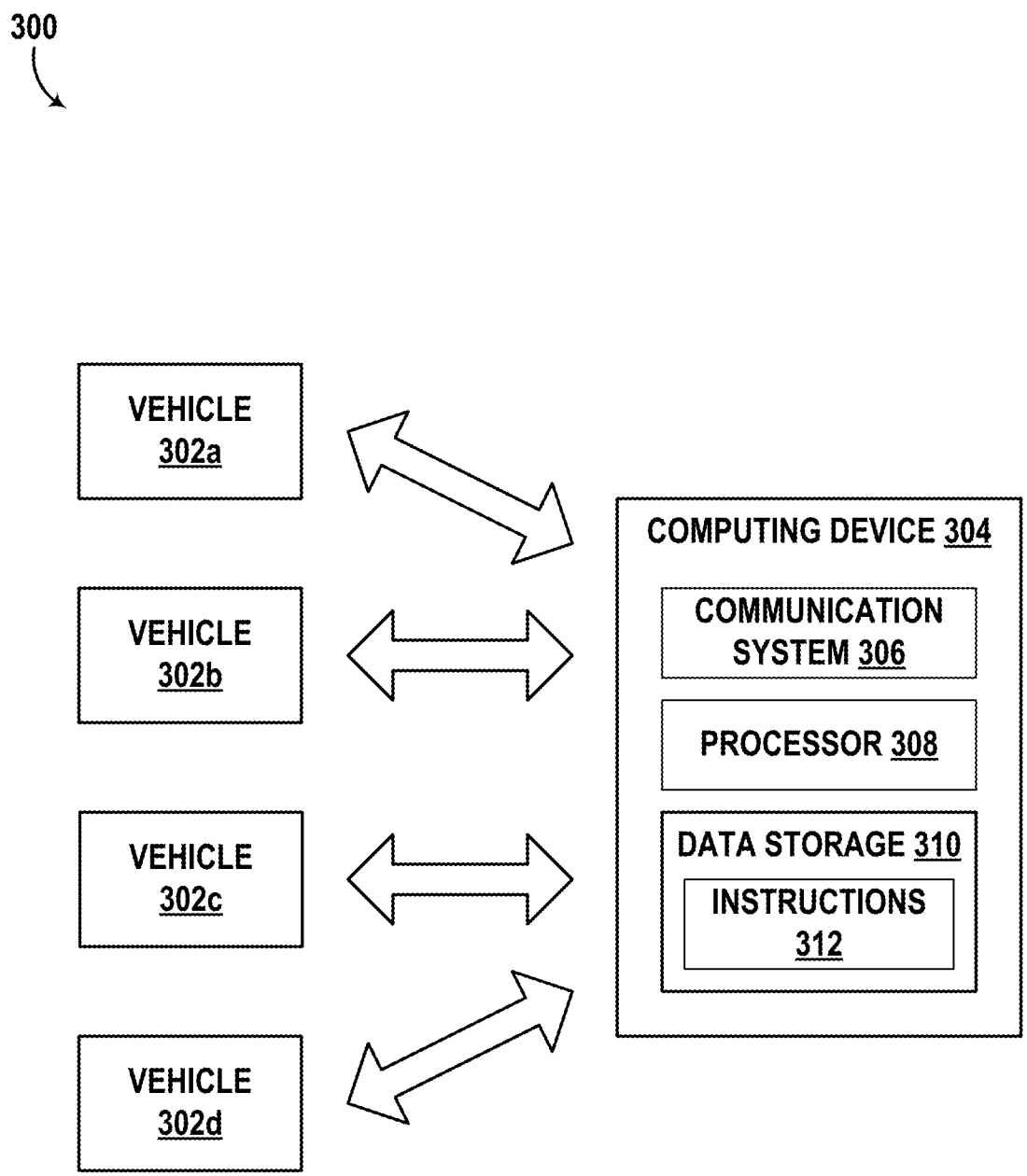
FIG. 3 is a simplified block diagram of a system, according to an example embodiment.

FIG. 3 is a simplified block diagram of a system 300, according to an example embodiment. The system 300 includes vehicles 302a-302d communicatively linked (e.g., via wired and/or wireless interfaces) to an external computing device 304. The vehicles 302a-302d and the computing device 304 may communicate within a network. Alternatively, the vehicles 302a-302d and the computing device 304 may each reside within a respective network.

The vehicles 302a-302d may be similar to the vehicles 100-200. For example, the vehicles 302a-302d may be partially or fully autonomous vehicles that each include a sensor (e.g., RADAR, etc.) to detect an environment of the vehicles 302a-302d. The vehicles 302a-302d may include components not shown in FIG. 3, such as a user interface, a communication interface, a processor, and data storage comprising instructions executable by the processor for carrying out one or more functions relating to the data sent to, or received by, the computing device 304. Further, the functions may also relate to control of the vehicles 302a-302d or components thereof, such as sensors, etc. To that end, the functions may also include methods and systems described herein.

The computing device 304 may be configured as a server or any other entity arranged to carry out the functions described herein. Further, the computing device 304 may be configured to send data/requests to the vehicles 302a-302d and/or to receive data from the vehicles 302a-302d. For example, the computing device 304 may receive location information from the vehicles 302a-302d as well as sensor configurations (e.g., direction, modulation pattern, etc.), and may responsively provide requests to proximate vehicles to adjust the corresponding sensor configurations to reduce interference between the corresponding sensors. Additionally or alternatively, for example, the computing device 304 may function as a medium for sharing the data (e.g., sensor configurations, locations, etc.) between the vehicles 302a-302d. Although FIG. 3 shows that the vehicles 302a-302d communicate via the computing device 304, in some examples, the vehicles 302a-302d may additionally or alternatively communicate directly with one another.

The computing device 304 includes a communication system 306, a processor 308, and data storage 310. The communication system 306 may be any system configured to communicate with the vehicles 302a-302d, or other entities, either directly or via a communication network, such as a wireless communication network. For example, the communication system 306 may include an antenna and a chipset for wirelessly communicating with the vehicles 302a-302d, servers, or other entities either directly or via a wireless communication network. Alternatively, in some examples, the communication system 306 may include a wired connection to a server or other entity in wireless communication with the vehicles 302a-302d. Accordingly, the chipset or the communication system 306 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities, or one or more types of wired communication such as Local Area Network (LAN), etc. The communication system 306 may take other forms as well.

The processor 308 may comprise one or more general-purpose processors and/or one or more special-purpose processors. To the extent the processor 308 includes more than one processor, such processors could work separately or in combination. Data storage 310, in turn, may comprise one or more volatile and/or one or more non-volatile storage components, such as optical, magnetic, and/or organic storage, and data storage 310 may be integrated in whole or in part with the processor 308.

In some embodiments, data storage 310 may contain instructions 312 (e.g., program logic) executable by the processor 308 to execute various functions described herein. Data storage 310 may contain additional instructions as well, including instructions to transmit data to, receive data from, interact with, and/or control one or more of the vehicles 302a-302d. The computer system 210 may additionally or alternatively include components other than those shown.

Figure 4:
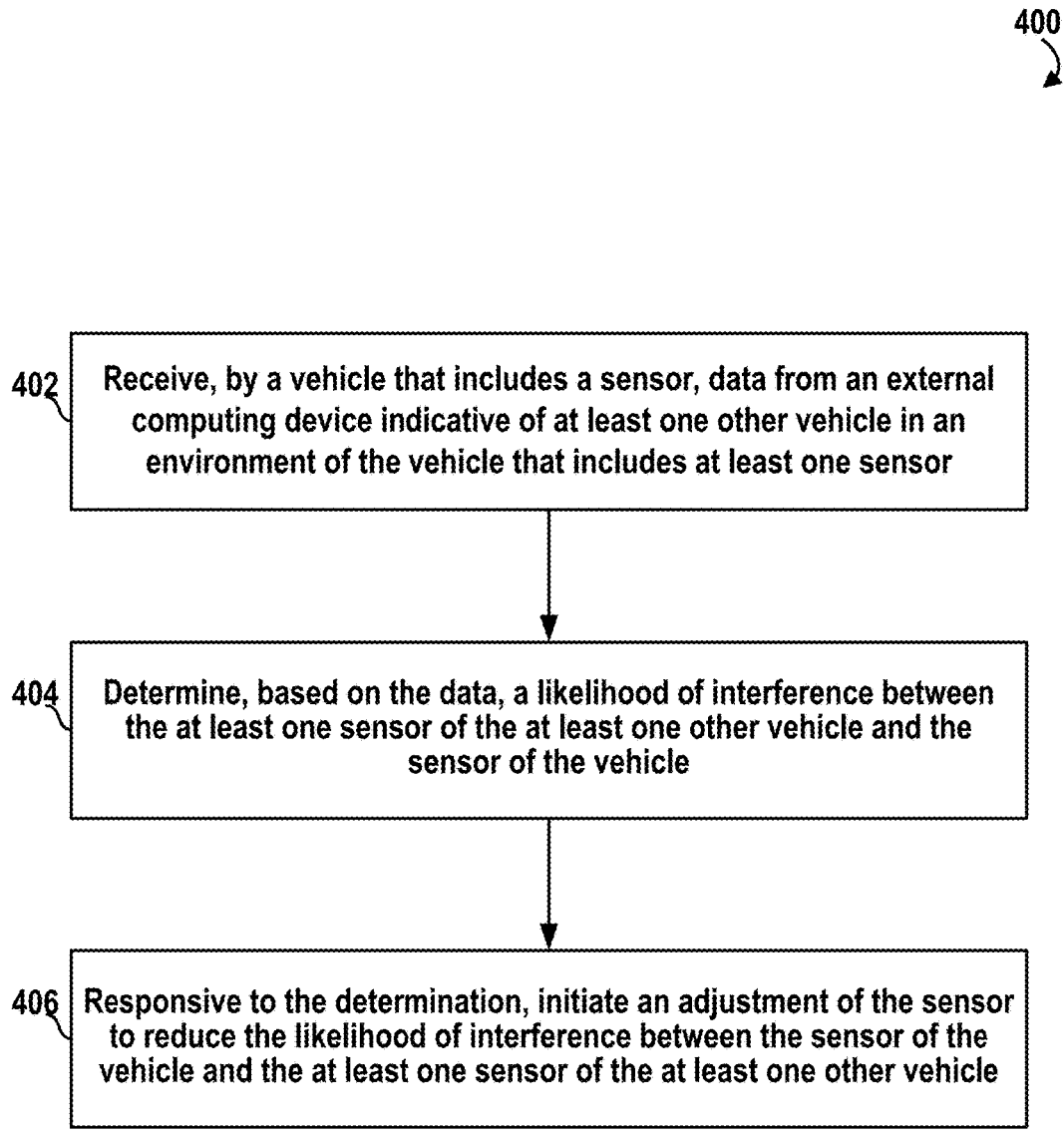
FIG. 4 is a block diagram of a method, according to an example embodiment.

FIG. 4 is a block diagram of a method 400, according to an example embodiment. Method 400 shown in FIG. 4 presents an embodiment of a method that could be used with the vehicles 100, 200, 302a-302d, or the computing device 304, for example. Method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process, for example.

The method 400 may describe a method for reducing a likelihood of interference between a sensor of a vehicle and other sensors of other vehicles.

At block 402, the method 400 includes the vehicle receiving data from an external computing device indicative of at least one other vehicle in an environment of the vehicle that includes at least one sensor. In some examples, the sensor of the vehicle may be configured to detect an environment of the vehicle based on a comparison between electromagnetic (EM) radiation transmitted by the sensor and a reflection of the EM radiation from one or more objects in the environment of the vehicle. For example, the sensor may include a radio detection and ranging (RADAR) sensor, similar to the radar unit 230 of the vehicle 200.

The external computing device may be similar to the computing device 304 of the system 300. Thus, for example, the vehicle may receive the data from the external computing device indicating proximity of the at least one other vehicle and/or presence of the at least one sensor in the at least one other vehicle that may interfere with the sensor of the vehicle.

Accordingly, at block 404, the method 400 includes determining a likelihood of interference between the at least one sensor of the at least one other vehicle and the sensor of the vehicle based on the data. By way of example, the data may indicate that a given vehicle is in front of the vehicle of block 402. Further, the data may indicate that the given vehicle has a backwards facing RADAR that is directed towards a forward facing RADAR (e.g., the sensor) of the vehicle. Therefore, the data from the external computing device may include information such as locations of the at least one other vehicle and configurations of the at least one sensor in the at least one other vehicle. In another example, the vehicle and the at least one other vehicle may be facing the same direction towards a large reflective object, thus forward facing transmitters of one vehicle may interfere with forward facing receivers of another vehicle.

To facilitate the determination at block 404, in some examples, the vehicle may include a location sensor similar to the GPS 226 of the vehicle 200 or any other location sensor. In these examples, the method 400 may perform the determination at block 404 based on a comparison between location of the at least one other vehicle (e.g., indicated by the data) and location of the vehicle (e.g., indicated by the location sensor). Additionally, the vehicle may include an orientation sensor similar to the IMU 228 of the vehicle 200. For example, the orientation sensor may be utilized to determine an orientation and/or heading of the vehicle to facilitate determining the likelihood of interference at block 404. For example, the vehicle may compare the orientation with orientations of the at least one other vehicle (and sensors thereon) to determine the likelihood of interference. Similarly, for example, the location of the vehicle may be compared with locations of the at least one other vehicle. Other examples are possible as well.

Accordingly, in some examples, the method 400 may also include identifying a location of the vehicle in the environment based on a location sensor in the vehicle. In these examples, the method 400 may also include determining that the at least one other vehicle is within a threshold distance to the vehicle based on the location from the location sensor and the data from the external computing device.

At block 406, the method 400 includes initiating an adjustment of the sensor responsive to the determination at block 404. The adjustment may reduce the likelihood of interference between the sensor of the vehicle and the at least one sensor of the at least one other vehicle. Various implementations of the method 400 are possible for performing the adjustment of the sensor at block 406.

In a first example implementation, the direction of the sensor and/or the EM radiation transmitted by the sensor may be adjusted by the vehicle. In one example, the vehicle may actuate a steering device (e.g., mount) of the sensor to steer the sensor away from the at least one sensor of the at least one other vehicle. In another example, the vehicle may adjust a direction of the EM radiation transmitted by the sensor (e.g., beam steering) by switching antenna elements in the sensor and/or changing relative phases of RF signals driving the antenna elements. Accordingly, in some examples, the method 400 may also include modifying a direction of the sensor.

In a second example implementation, a power of the EM radiation transmitted by the sensor may be modified. For example, the data may indicate that the at least one other vehicle is at a given distance from the vehicle. In this example, the vehicle (and/or the at least one other vehicle) may be operated by the method 400 to reduce the power of the EM radiation transmitted by the sensor (and/or the at least one sensor of the at least one other vehicle) to reduce the interference. For example, the external computing device may provide a request to the vehicle and/or the at least one other vehicle to modify the power of corresponding EM radiation transmitted by each vehicle to reduce the interference. Accordingly, in some examples, the method 400 may also include modifying a power of the EM radiation transmitted by the sensor.

Further, in some embodiments of the second example implementation, the vehicle may include a velocity sensor similar to the GPS 226 and/or the IMU 228 of the vehicle 200 or any other velocity sensor. In these embodiments, the velocity sensor may be configured to detect a direction of travel and/or a speed of the vehicle. In one example, if the direction of travel is towards the at least one other vehicle, the method 400 may optionally include reducing the power of the EM radiation based on the determination. sensor In another example, the vehicle and the at least one other vehicle may be travelling in the same direction with the vehicle travelling ahead of the at least one other vehicle. On one hand, if the vehicle is travelling at a greater speed than the at least one other vehicle, a backward facing RADAR on the vehicle may reduce its power because of the likelihood of an accident being lower. On the other hand, if the vehicle is travelling at a lower speed, the power may be increased in anticipation of the at least one other vehicle getting closer to the vehicle. Further, in some examples, the method 400 may also include reducing the power of the EM radiation by an amount based on the speed of the vehicle. For example, the reduction of power may be scaled based on the rate at which the two vehicles are travelling apart from each other.

In a third example implementation, the method 400 may also include modifying a modulation pattern of the EM radiation to reduce the interference. Modifying the modulation pattern, for example, may include applying a time offset to the modulation pattern, applying a frequency offset to the modulation pattern, adjusting a frequency bandwidth of the modulation pattern, and/or adjusting a shape of the modulation pattern among other possibilities.

By way of example, the modulation pattern of the EM radiation may be a frequency modulated continuous wave (FMCW) RADAR modulation, where the frequency of the EM radiation is adjusted over time in accordance with the modulation pattern. A receiver of the sensor (e.g., RADAR receiver) may filter incoming EM radiation based on the modulation pattern.

Therefore, in one example, the vehicle may adjust the modulation pattern by applying an offset among the other possibilities described above to distinguish the modulation pattern of the sensor from the modulation pattern of the at least one sensor of the at least one other vehicle. In this example, the offset may be a frequency offset or a time offset. In another example, the vehicle may adjust the modulation pattern by adjusting a frequency bandwidth or a shape of the modulation pattern. In yet another example, the vehicle may adjust the modulation pattern by applying a particular phase-shift keying (PSK) modulation scheme to the EM radiation transmitted by the sensor, and the receiver may filter the incoming EM radiation based on the particular PSK scheme (e.g., to distinguish the EM radiation transmitted by the sensor from other EM radiation transmitted by other sensors of other vehicles). PSK is a digital modulation scheme that conveys data by changing, or modulating, a phase of the transmitted EM radiation. For example, the transmitted EM radiation may be conditioned to have a finite number of phases, each assigned a unique pattern of binary digits, and such pattern of binary digits may be detect at a digital signal processor coupled to the receiver of the sensor to identify the source of the EM radiation. Various PSK schemes are possible such as Binary phase-shift keying (BPSK), Quadrature phase-shift keying (QPSK), High-order PSK, Differential phase-shift keying (DPSK), etc.

Figure 5:
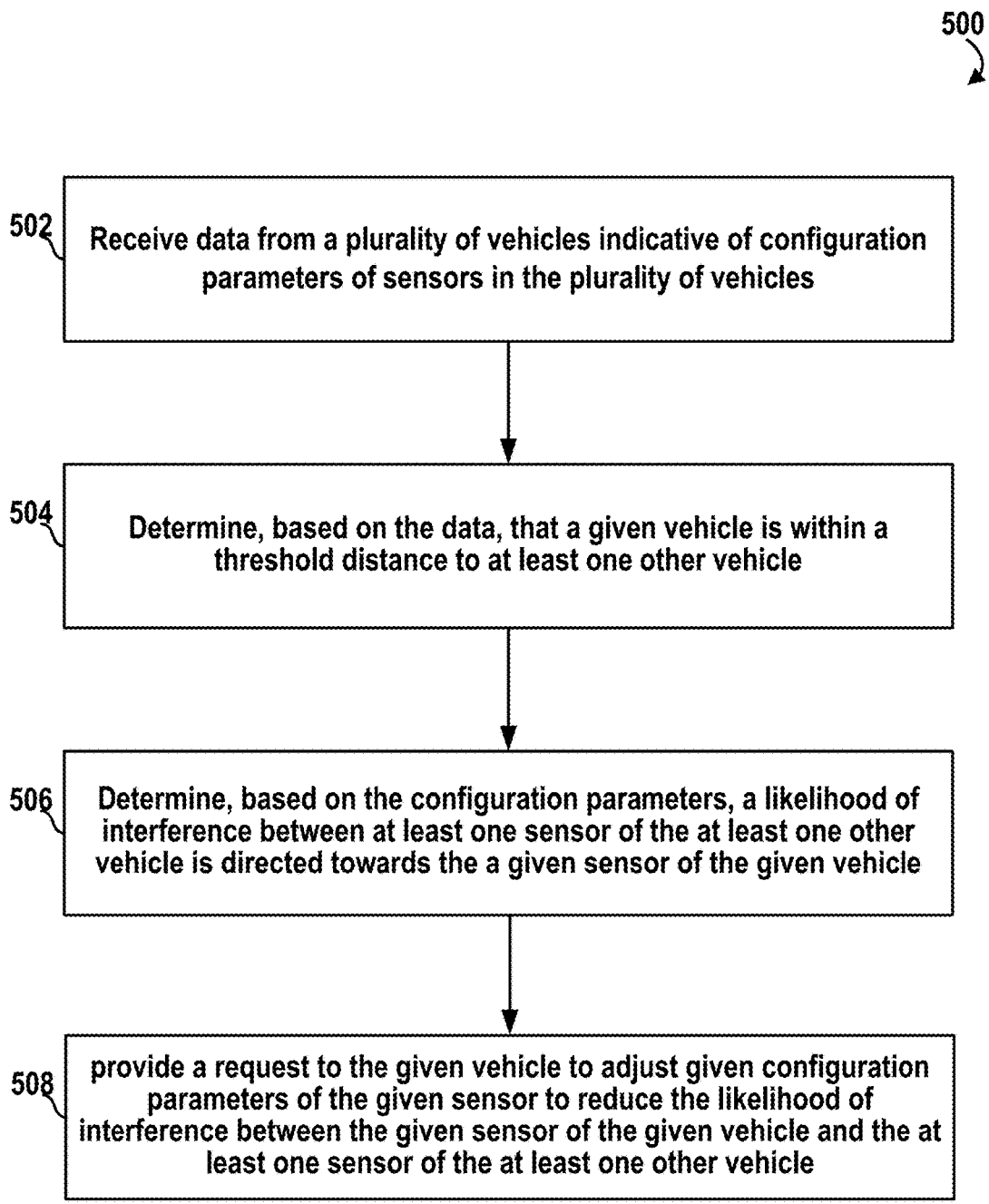
FIG. 5 is a block diagram of another method, according to an example embodiment.

FIG. 5 is a block diagram of another method 500, according to an example embodiment. Method 500 shown in FIG. 5 presents an embodiment of a method that could be used with the vehicles 100, 200, 302a-302d, or the computing device 304, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes receiving data from a plurality of vehicles indicative of configuration parameters of sensors in the plurality of vehicles. The data may be received, for example, by a computing device that includes one or more processors, similar to the computing device 304, that is coupled to the plurality of vehicles via one or more wired/wireless mediums. By way of example, the computing device may reside in a network that includes a broadcast tower configured to receive wireless signals from the plurality of vehicles. The plurality of vehicles (e.g., cars, trucks, trains, watercraft, etc.) may include the sensors such as RADARs that are configured to detect an environment of the plurality of vehicles. In an example scenario, a given vehicle may be traveling along roads of a city (e.g., the environment) and a given sensor of the given vehicle may detect objects or other vehicles in the vicinity of the given vehicle. In the example scenario, the given sensor may detect the environment based on a comparison between EM radiation transmitted by the given sensor and a reflection of the EM radiation from one or more objects in the environment of the vehicle. Further, the data may indicate the configuration parameters of the sensors such as direction, power, modulation pattern, etc., of the sensor and/or the EM radiation thereof. In some examples, the data may also indicate locations of the plurality of vehicles.

At block 504, the method 500 includes determining that a given vehicle is within a threshold distance to at least one other vehicle based on the data. By way of example, the given vehicle and the at least one other vehicle may be travelling behind one another, or may be heading towards an intersection, and the data received by the computing device may indicate that the two vehicles are within the threshold distance to one another that may cause interference between respective sensors of the two vehicles.

At block 506, the method 500 includes determining a likelihood of interference between at least one sensor of the at least one other vehicle and a given sensor of the given vehicle based on the configuration parameters. For example, a first RADAR in the given vehicle (e.g., the given sensor) may be directed towards a second RADAR in the at least one other vehicle. In this example, the signals from the second RADAR may be received by the first RADAR causing an interference (e.g., the first RADAR may incorrectly deduce that the second RADAR signal is a reflection of the EM radiation from the first RADAR). Thus, the computing device of the method 500 may utilize the information from the plurality of vehicles such as the configuration parameters of the sensors and/or the locations of the plurality of vehicles to determine the likelihood of the interference.

At block 508, the method 500 includes providing a request to the given vehicle to adjust given configuration parameters of the given sensor to reduce interference between the given sensor of the given vehicle and the at least one sensor of the at least one other vehicle. The provision of the request may be based on the likelihood of interference being greater than a threshold likelihood. Various adjustments to the given configuration parameters of the given sensor are possible similarly to the adjustments at block 406 of the method 400. For example, a direction, power, modulation pattern, bandwidth, or any other adjustment may be indicated by the request at block 508. Further, in some examples, the method 500 may also include providing similar requests to the at least one other vehicle to further reduce the likelihood of the interference.

By way of example, each of the plurality vehicles may be instructed by the computing device to have a respective binary phase-shift keying (BPSK) scheme to reduce the likelihood of interference. For example, proximate vehicles may include different BPSK schemes. Further, for example, the BPSK schemes may be reused for vehicles that are not proximate, or that have a lower likelihood of receiving EM radiation from one another. Thus, for example, BPSK codes may be spatially reused based on the determination of the likelihood at block 506.

Additionally, in some examples, the computing device at block 508 may provide the request for a combination of adjustments. For example, a frequency offset, time offset, and/or power adjustment may be indicated by the request to reduce the likelihood of particular interference effects (e.g., overload) on a front-end receiver of a radar. Additionally, in this example, BPSK encoding adjustment may also be indicated by the request to help distinguish the source of EM radiation in proximate vehicles. Other examples are possible as well.

Figure 6:
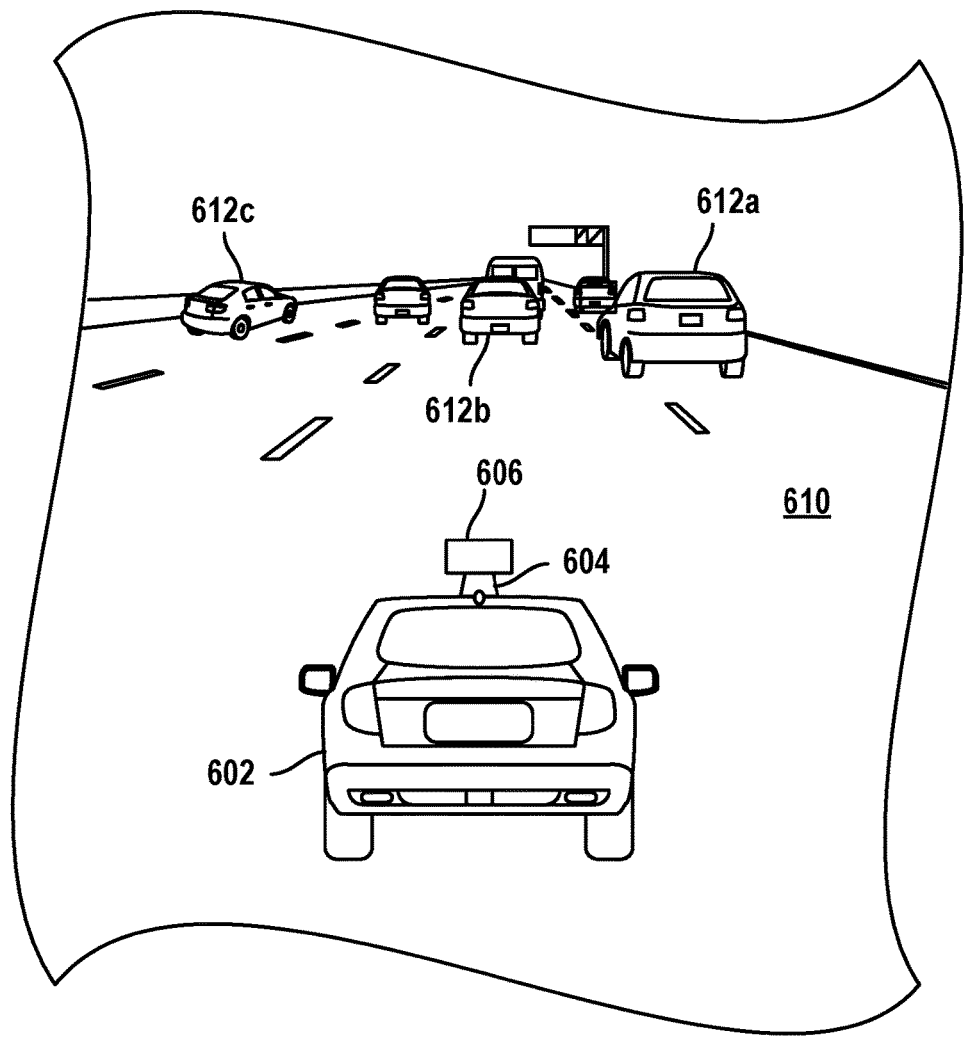
FIG. 6 illustrates a plurality of vehicles within an environment of a vehicle that includes a sensor, according to an example embodiment.

FIG. 6 illustrates a plurality of vehicles 612a-612c within an environment of a vehicle 602 that includes a sensor 606, according to an example embodiment. The vehicles 602 and 612a-c may be similar to the vehicles 100, 200, 302a-302d of FIGS. 1-3. For example, the vehicle 602 may include the sensor 606 (e.g., RADAR, LIDAR, etc.) similar to the radar unit 230 and/or the lidar unit 232 of the vehicle 200. Further, the vehicle 602 includes a mount 604 ("steering device") configured to adjust a direction of the sensor 606. The mount 604, for example, may be a moveable mount comprising materials suitable for supporting the sensor 606 and may be operated by a control system (not shown) to rotate the sensor 606 about a mount axis to modify the direction of the sensor 606. Alternatively, the mount 604 may modify the direction of the sensor 606 in a different manner. For example, the mount 604 (e.g., steering device) may translate the sensor 606 along a horizontal plane, etc.

As illustrated in FIG. 6, the vehicles 602 and 612a-612c are travelling on a road 610. Further, the vehicles 612a-612c may include sensors (not shown in FIG. 6) that may interfere with operation of the sensor 606 of the vehicle 602. Various scenarios to reduce interference between such sensors and the sensor 606 in accordance with the present disclosure are presented below.

In a first scenario, the vehicle 612a may include a backward facing sensor (not shown) that is directed towards the sensor 606. The vehicle 602 may determine such scenario via a method such as the methods 400-500. For example, the vehicle 602 may receive data from a server (not shown) that indicates that the sensors are directed at one another. In the scenario, the vehicle 602, for example, may adjust the direction of the sensor 606 via the mount 604 ("steering device") to reduce such interference. For example, the mount 604 may rotate the sensor 606 slightly away from the direction of the vehicle 612a.

In a second scenario, the vehicle 612b may also include a backward facing sensor (not shown) that is directed towards the sensor 606. In this scenario, for example, the vehicle 602 may adjust a modulation pattern of EM radiation from the sensor 606 to reduce interference between the sensor of the vehicle 612b and the sensor 606 of the vehicle 602. For example, the EM radiation of the sensor of vehicle 612b may have the shape of a triangular wave, and the vehicle 602 may adjust the shape of the EM radiation from the sensor 606 to correspond to a sawtooth shape, or may adjust a slope of the triangular wave. Other examples are possible as well.

In a third scenario, the vehicle 612c may also include a backward facing sensor (not shown) that is directed towards the sensor 606. In this scenario, the sensor of the vehicle 612c may receive signals from the sensor 606 that interfere with the sensor of the vehicle 612c. Accordingly, in the scenario, the vehicle 602 may reduce power of the EM radiation from the sensor 606 such that the EM radiation may not significantly interfere with the sensor of the vehicle 612c after traversing a given distance to the vehicle 612c.

Other scenarios are possible as well in accordance with the present disclosure.

Figure 7:
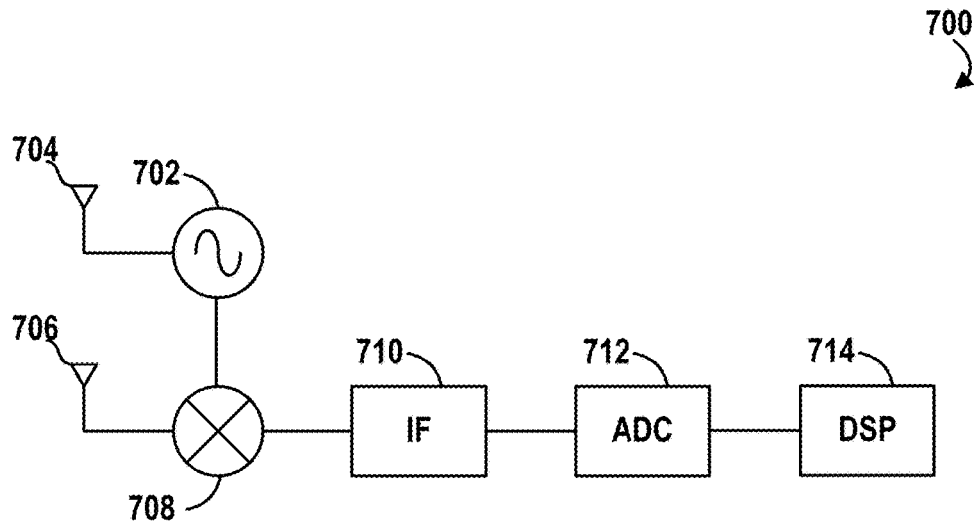
FIG. 7 is a simplified block diagram of a sensor, according to an example embodiment.

FIG. 7 is a simplified block diagram of a sensor 700, according to an example embodiment. The sensor 700, for example, may include a frequency modulated continuous wave (FMCW) RADAR. The sensor 700 includes a local oscillator 702, a transmitter 704, a receiver 706, a mixer 708, an intermediate frequency (IF) filter 710, an analog-to-digital converter (ADC) 712, and a digital signal processor (DSP) 714. The sensor 700, for example, may be similar to the radar unit 230 of the vehicle 200.

It is noted that the blocks 702-714 are for exemplary purposes only. In some examples some of the blocks in the sensor 700 may be combined or divided into other blocks. For example, FIG. 7 shows a single channel transmitter 704 and receiver 706. In some embodiments the sensor 700 may include multiple transmitters and/or receivers. In one example configuration, the sensor 700 may include 2 transmitters and 4 receivers. In another example configuration, the sensor 700 may include 4 transmitters and 8 receivers. Other examples are possible as well. Further, for example, the receiver 706 may include the mixer 708.

The local oscillator 702 may include any oscillator (e.g., coherent oscillator, etc.) that is configured to output a continuous wave. The wave may be utilized by the transmitter 704 (e.g., transmitter antenna) to radiate electromagnetic (EM) radiation towards an environment of the sensor 700. By way of example, the local oscillator 702 may be configured to sweep a particular bandwidth (e.g., 76 Ghz-77 Ghz) at a periodic rate to provide the continuous wave to the transmitter 704.

The EM radiation may reflect off one or more objects in the environment, and the reflected EM radiation may be received by the receiver 706 in accordance with the methods 400-500. In some examples, the transmitter 704 and the receiver 706 may include any antenna such as a dipole antenna, a waveguide antenna, a waveguide array antenna, or any other type of antenna.

The signal from the receiver 706 may be received by the mixer 708 along with a signal from the local oscillator 702. The mixer 708 may include any electronic mixer device such as an unbalanced crystal mixer, a point-contact crystal diode, a schottky-barrier diode or any other mixer. The mixer 708 may be configured to provide an output that includes a mixture of the frequencies in the input signals such as a sum of the frequencies or a difference of the frequencies.

The signal from the mixer 708 may be received by the IF filter 710 that is configured to filter a desired intermediate frequency out of the mixture frequencies from the mixer 708. In some examples the IF filter 710 may include one or more bandpass filters. The IF filter 710 may have a particular bandwidth associated with a resolution of the sensor 700. The ADC 712 may then receive the signal from the IF filter 710 and provide a digital representation of the IF filter 710 output to the DSP 714 sensor.

The DSP 714 may include any digital signal processing device or algorithm to process the data from the ADC 712 for determination of range, angle, or velocity of the one or more objects in the environment of the sensor 700. The DSP 714, for example, may include one or more processors. In one example, the DSP 714 may be configured to determine a Binary Phase-Shift keying (BPSK) scheme of the signal received by the receiver 706. In this example, the DSP 714 may identify the source of the received EM radiation. For example, the BPSK scheme of the transmitted EM radiation by the transmitter 704 may be compared with the BPSK scheme of the EM radiation received by the receiver 706.

Figure 8:
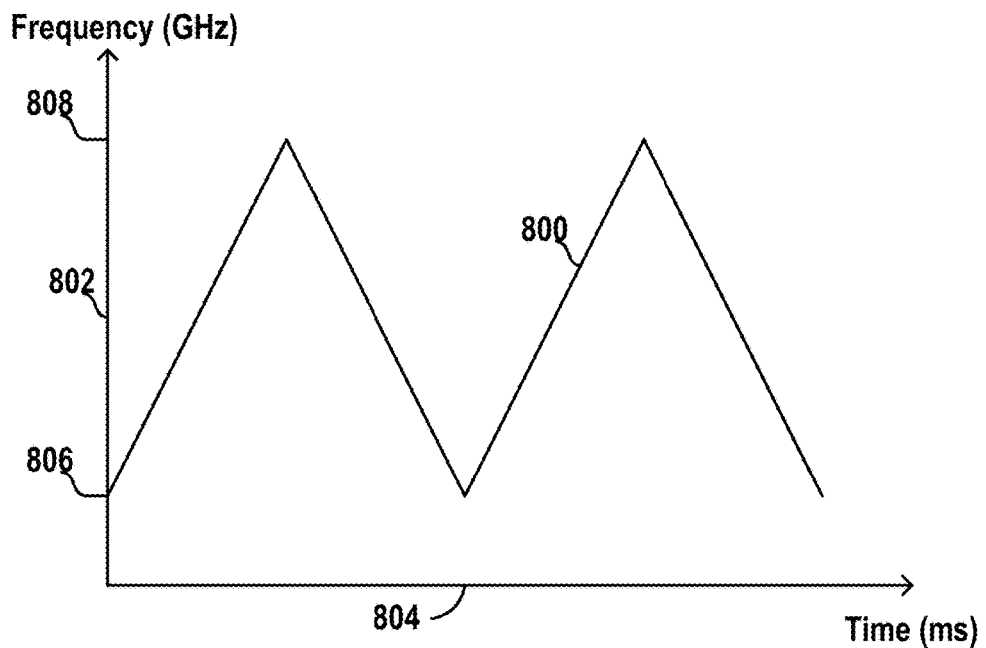
FIG. 8 illustrates a modulation pattern of electromagnetic (EM) radiation from a sensor, according to an example embodiment.

FIG. 8 illustrates a modulation pattern 800 of electromagnetic (EM) radiation from a sensor, according to an example embodiment. The modulation pattern 800 may correspond to the continuous wave provided by a local oscillator in the sensor similar to the local oscillator 702 of the sensor 700. FIG. 8 shows the modulation pattern 800 along a frequency axis 802 (vertical axis) and a time axis 804 (horizontal axis).

Thus, for example, the EM radiation may have a continuously changing frequency between a minimum frequency 806 and a maximum frequency 808. The minimum frequency 806 and the maximum frequency 808 could, for example, span a frequency range of 76 GHz to 77 GHz, part of this frequency range, or some other frequency range. In the example shown in FIG. 8, the modulation pattern 800 corresponds to a triangular pattern. However, in other examples, the shape of the modulation pattern 800 may correspond to any other shape such as a sawtooth pattern, a square wave pattern, a sine wave pattern, or any other shape.

In an example operation of a sensor, such as the sensor 700, the EM radiation having the modulation pattern 800 may be transmitted by a transmitter (e.g., the transmitter 704) and a reflection of the modulation pattern 800 may be received by a receiver (e.g., the receiver 706). By comparing the modulation pattern 800 of the transmitted wave with a modulation pattern of the reflected wave distances and velocities of objects in the environment of the sensor may be determined. For example, the time offset between the transmitted wave and the received wave may be utilized to determine the distance (e.g., range) to the object. Further, for example, a change in the slope of the modulated pattern 800 may be utilized to determine the velocity of the object (e.g., Doppler velocity, etc.) relative to the sensor.

FIGS. 9A-9E illustrate example scenarios 900a-900e for adjusting a modulation pattern of EM radiation from a sensor to reduce interference with other sensors, in accordance with at least some embodiments herein. The scenarios 900a-900e present modulated patterns along a frequency axis 902 and a time axis 904 that are similar, respectively, to the frequency axis 802 and the time axis 804 of FIG. 8. In FIGS. 9A-9E, modulated patterns 910a-910e may correspond to modulated patterns of EM radiation from a first sensor in a first vehicle, and modulated patterns 912a-912e may correspond to modulated patterns of EM radiation from a second sensor in a second vehicle. The scenarios 900a-900e present various adjustments of the corresponding modulation patterns to reduce interference in accordance with the present disclosure.

Figure 9A:
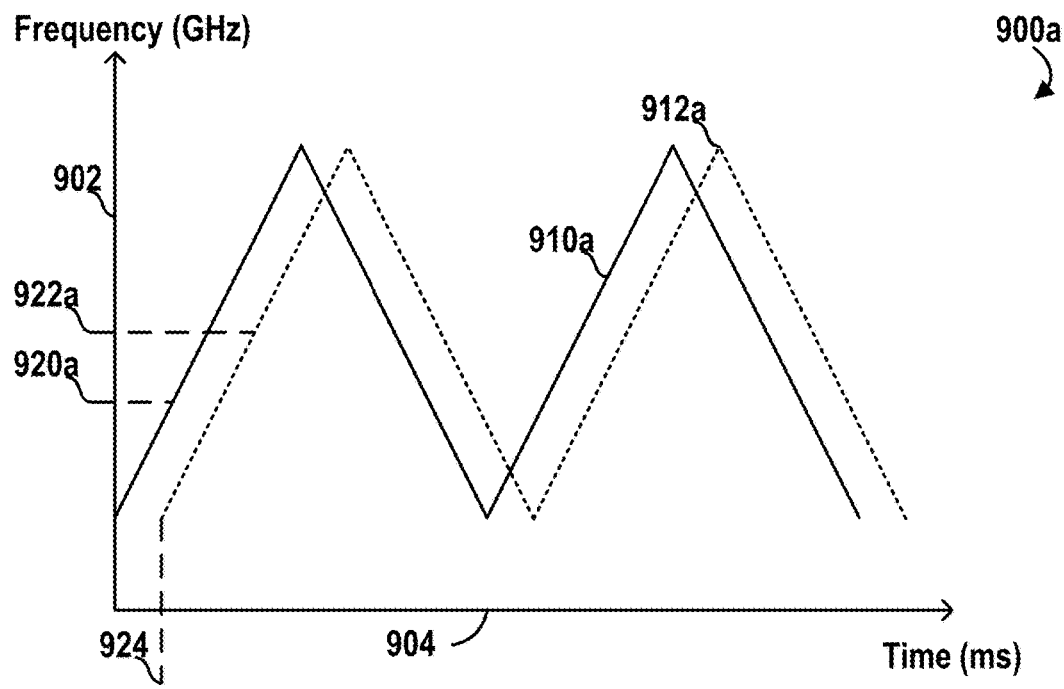
FIGS. 9A-9E illustrate example scenarios for adjusting a modulation pattern of EM radiation from a sensor to reduce interference with other sensors, in accordance with at least some embodiments herein.

In scenario 900a of FIG. 9A, the modulated pattern 912a of the second sensor may be offset by a time offset 924 to distinguish the modulated pattern 910a from the modulated pattern 912a. For example, the time offset 924 may cause a frequency offset from frequency 920a to frequency 922a between the two waveforms 910a and 912a. Accordingly, a filter such as the IF filter 710 of the sensor 700 may be able to distinguish radiation of the corresponding waveform. For example, the frequency offset (920a-922a) may be selected to be greater than a bandwidth of the IF filter of the first sensor associated with waveform 910a and/or the IF filter of the second sensor associated with waveform 912a.

Figure 9B:
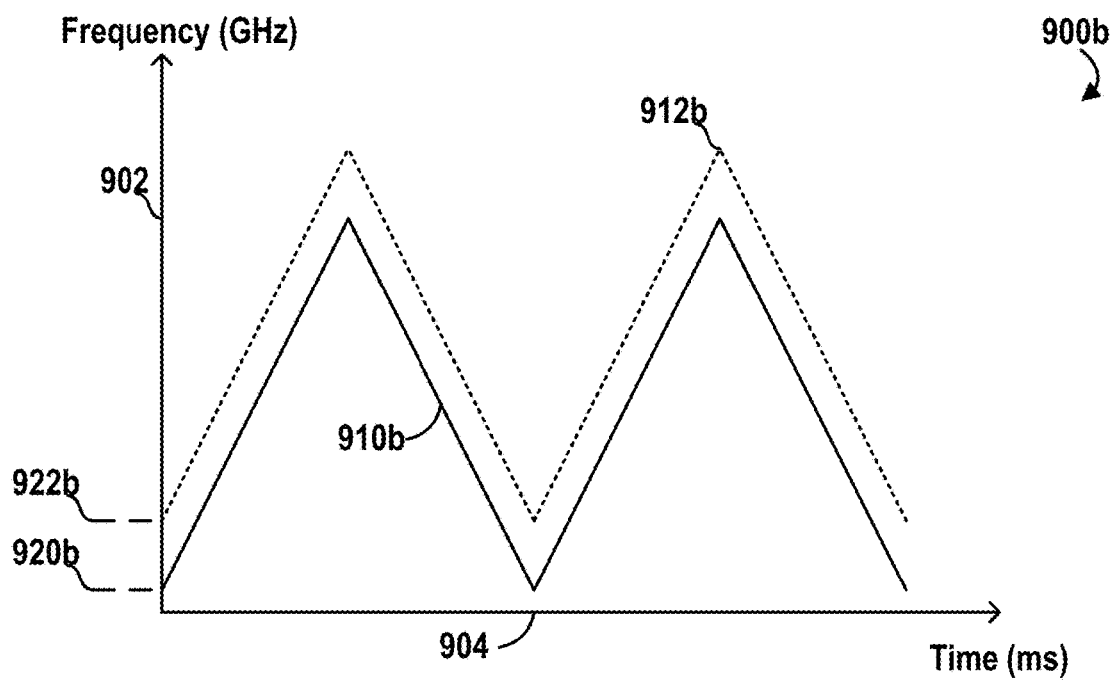

In scenario 900b of FIG. 9B, waveforms 910b and 912b may be alternatively distinguished by applying a frequency offset between the frequencies 920b and 922b. Similarly to scenario 900a, for example, such frequency offset may allow a sensor such as the sensor 700 to distinguish between the two waveforms (e.g., based on the IF filter bandwidth).

Figure 9C:
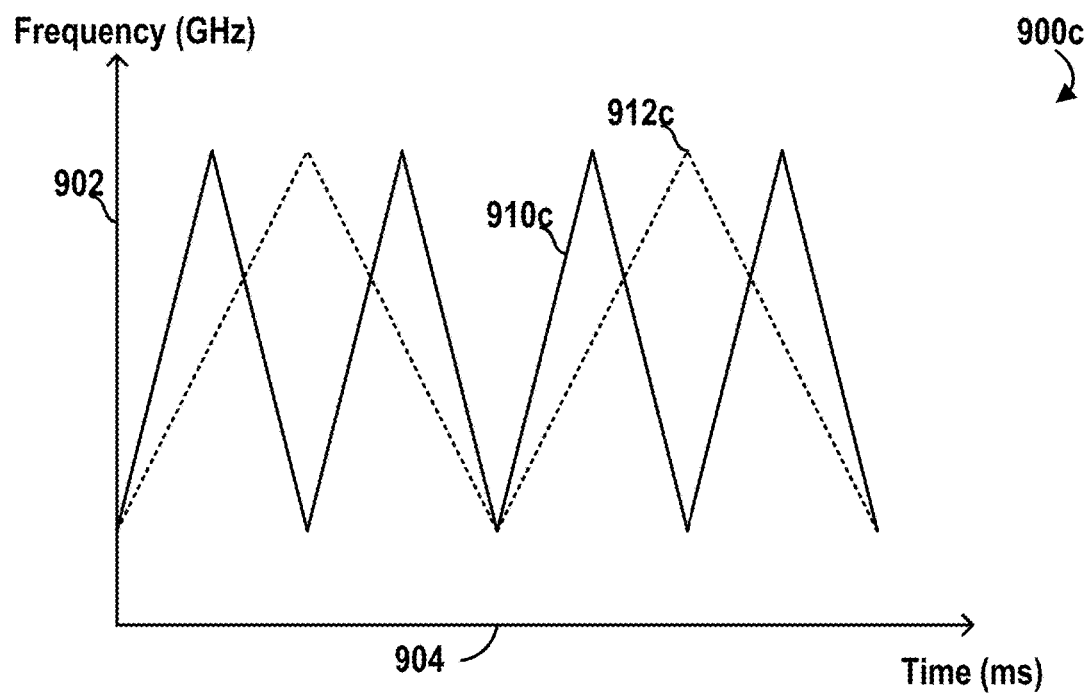

In scenario 900c of FIG. 9C, the modulation pattern 910c and/or 912c may alternatively be adjusted to have a different shape. For example, FIG. 9C shows the modulated pattern 910c (e.g., of the first sensor) to have a different slope than the modulated pattern 912c (e.g., of the second sensor). Alternatively, in some examples, other changes to the modulated patterns 910c and 912c may be applied. For example, a different shape may be utilized by one of the two sensors (e.g., triangular, sawtooth, sine wave, etc.).

Figure 9D:
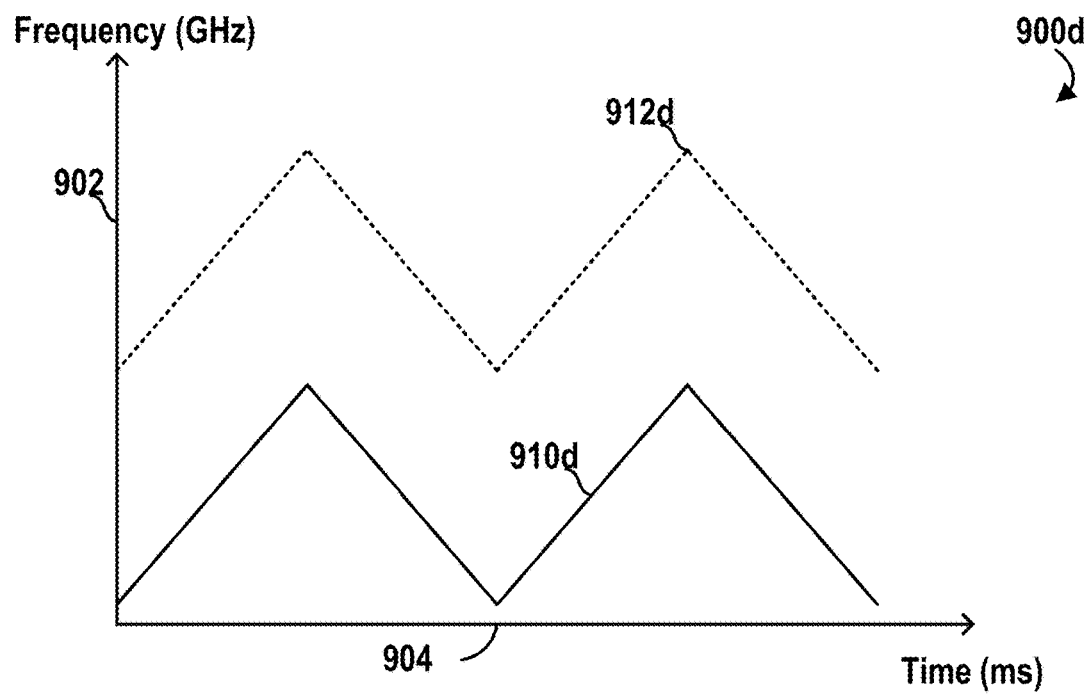

In scenario 900d of FIG. 9D, a frequency bandwidth of the modulation patterns 910d and 912d may be adjusted. For example, the first sensor may be adjusted to output the modulated pattern 910d having a minimum frequency of 76 GHz and a maximum frequency of 76.45 GHz, and the second sensor may be adjusted to output the modulated pattern 912d having a minimum frequency of 76.5 GHz and a maximum frequency of 77 GHz. Thus, for example, a filter such as the IF filter 710 may be configured to filter the signals for frequencies in the corresponding bandwidth.

Figure 9E:
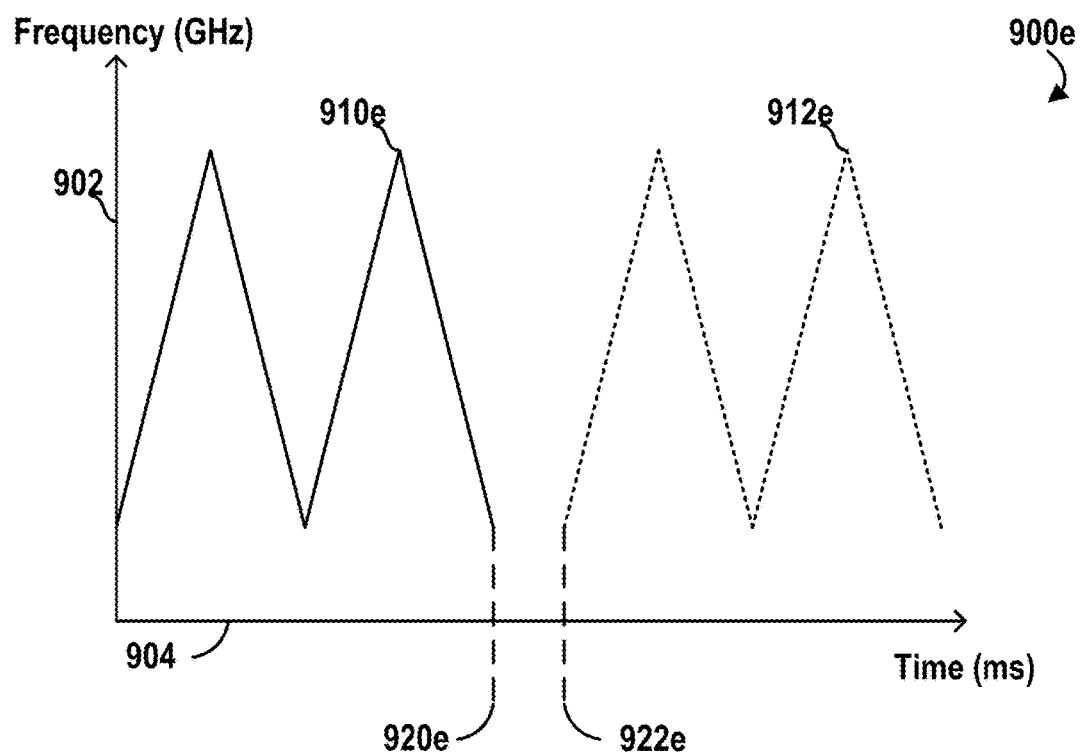

In scenario 900e of FIG. 9E, the first sensor and the second sensor may be configured to intermittently stop providing EM radiation. For example, the EM radiation of the first sensor (e.g., the modulation pattern 910e) may be stopped by the first vehicle and the modulation pattern 912e of the second sensor may be started after a time offset illustrated in FIG. 9E as the time offset between times 920e and 922e. Accordingly, the receivers of the first sensor and the second sensor may avoid receiving signals from transmitters of one another.

Scenarios 900a-900e of FIGS. 9A-9E are illustrated for exemplary purposes only. Other scenarios are possible for adjusting the modulation pattern of a sensor to reduce the interference in accordance with methods 400-500 of the present disclosure.

Figure 10:
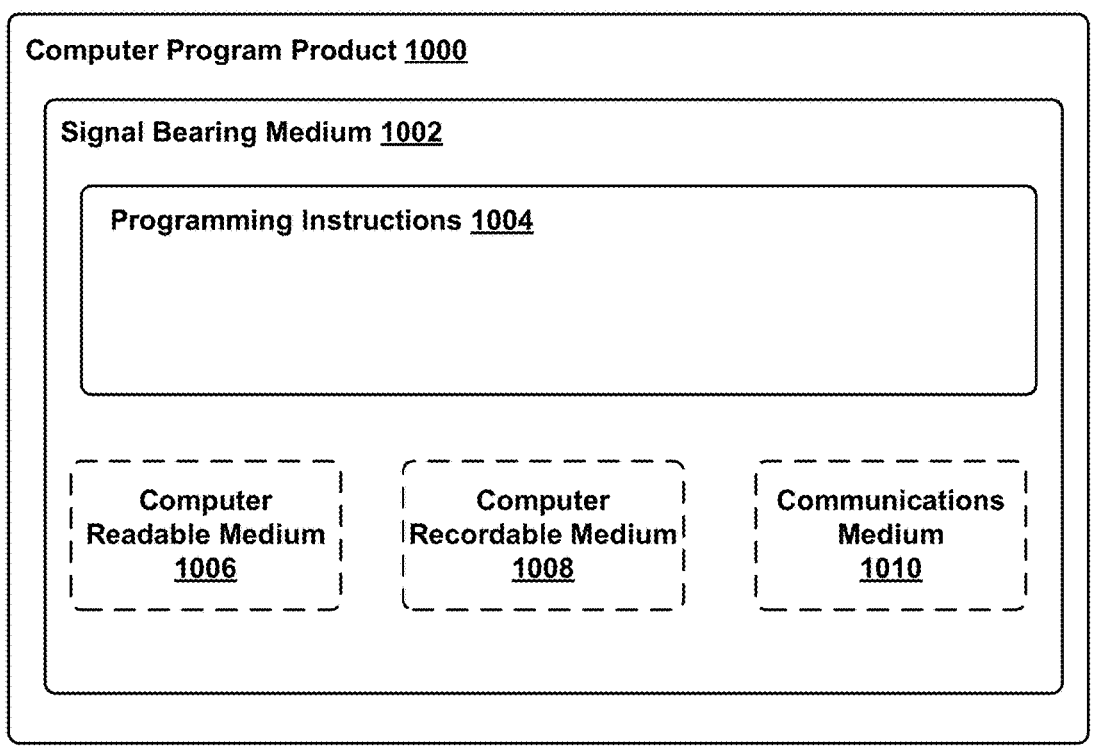
FIG. 10 depicts an example computer readable medium configured according to an example embodiment.

FIG. 10 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 400, 500, etc.) may be implemented by computer program instructions encoded on a computer readable storage media in a machine-readable format, or on other media or articles of manufacture (e.g., instructions 216 of the vehicle 200, instructions 312 of the computing device 304, etc.). FIG. 10 is a schematic illustrating a conceptual partial view of an example computer program product that includes a computer program for executing a computer process on a computing device, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A vehicle comprising:
a sensor that detects an environment of the vehicle based on a comparison between electromagnetic (EM) radiation transmitted by the sensor and a reflection of the EM radiation from one or more objects in the environment of the vehicle; and
a controller that (i) receives data from an external computing device indicative of at least one other vehicle in the environment of the vehicle, the at least one other vehicle including at least one sensor that transmits given EM radiation and detects reflections of the given EM radiation, (ii) determines a likelihood of interference between the at least one sensor of the at least one other vehicle and the sensor of the vehicle based on the data, and (iii) responsively initiates an adjustment of the sensor to reduce the likelihood of interference between the sensor of the vehicle and the at least one sensor of the at least one other vehicle.

2. The vehicle of claim 1, further comprising:
a location sensor that identifies a location of the vehicle in the environment, wherein the controller determines that the at least one other vehicle is within a threshold distance to the vehicle based on the location sensor and the data, and wherein the controller determines the likelihood of interference based on the determination; and
an orientation sensor that identifies an orientation of the vehicle, wherein the controller compares the orientation of the vehicle with at least one orientation of the at least one other vehicle indicated by the data, and wherein the controller determines the likelihood of interference based on the comparison.

3. The vehicle of claim 1, wherein the sensor includes a radio detection and ranging (RADAR) sensor.

4. The vehicle of claim 1, further comprising:
a steering device that adjusts a direction of the sensor, wherein the adjustment of the sensor comprises an adjustment of the direction of the sensor.

5. The vehicle of claim 1, wherein the adjustment of the sensor comprises an adjustment of a power of the EM radiation transmitted by the sensor.

6. The vehicle of claim 5, further comprising:
a velocity sensor that detects a direction of travel and a speed of the vehicle, wherein the controller reduces the power of the EM radiation in response to a determination that the direction of travel is away from the at least one other vehicle.

7. The vehicle of claim 6, wherein the controller to reduces the power of the EM radiation by an amount based on the speed of the vehicle.

8. The vehicle of claim 1, wherein the EM radiation has a modulation pattern, and wherein the adjustment of the sensor comprises an adjustment of the modulation pattern of the EM radiation.

9. The vehicle of claim 8, wherein the adjustment of the modulation pattern comprises a time offset applied to the modulation pattern.

10. The vehicle of claim 8, wherein the adjustment of the modulation pattern comprises a frequency offset applied to the modulation pattern.

11. The vehicle of claim 8, wherein the adjustment of the modulation pattern comprises an adjustment of a frequency bandwidth of the modulation pattern.

12. The vehicle of claim 8, wherein the adjustment of the modulation pattern comprises an adjustment of a shape of the modulation pattern.

13. The vehicle of claim 8, wherein the adjustment of the modulation pattern comprises an adjustment of a Binary Phase-Shift Keying (BPSK) scheme associated with the modulation pattern.

14. A method comprising:
receiving, by a vehicle that includes a sensor configured to detect an environment of the vehicle based on a comparison between electromagnetic (EM) radiation transmitted by the sensor and a reflection of the EM radiation from one or more objects in the environment of the vehicle, data from an external computing device indicative of at least one other vehicle in the environment of the vehicle, the at least one other vehicle including at least one sensor that transmits given EM radiation and detects reflections of the given EM radiation;
determining, based on the data, a likelihood of interference between the at least one sensor of the at least one other vehicle and the sensor of the vehicle; and
based on the likelihood being greater than a threshold likelihood, initiating an adjustment of the sensor to reduce the likelihood of interference between the sensor of the vehicle and the at least one sensor of the at least one other vehicle.

15. The method of claim 14, further comprising:
modifying a direction of the EM radiation transmitted by the sensor, wherein the adjustment of the sensor includes modifying the direction.

16. The method of claim 14, further comprising:
modifying a modulation pattern of the EM radiation, wherein the adjustment of the sensor includes modifying the modulation pattern.

17. The method of claim 16, wherein modifying the modulation pattern of the EM radiation comprises one or more of: (i) applying a time offset to the modulation pattern, (ii) applying a frequency offset to the modulation pattern, (iii) adjusting a frequency bandwidth of the modulation pattern, (iv) adjusting a shape of the modulation pattern, or (v) adjusting a Phase-Shift Keying (PSK) scheme of the modulation pattern.

18. The method of claim 14, further comprising:
identifying, based on a location sensor in the vehicle, a location of the vehicle in the environment;
identifying, based on an orientation sensor in the vehicle, an orientation of the vehicle in the environment; and
determining, based on the data from the external computing device, at least one location and at least one orientation of the at least one other vehicle, wherein determining the likelihood of interference is based on the location of the vehicle, the orientation of the vehicle, the at least one location of the at least one other vehicle, and the at least one orientation of the at least one other vehicle.

19. A method comprising:
receiving, by a computing device that includes one or more processors, data from a plurality of vehicles indicative of configuration parameters of sensors in the plurality of vehicles, wherein the data is also indicative of locations of the plurality of vehicles, and wherein a given sensor of a given vehicle is configured to detect an environment of the given vehicle based on a comparison between electromagnetic (EM) radiation transmitted by the given sensor and a reflection of the EM radiation from one or more objects in the environment of the given vehicle;

determining, based on the data, that the given vehicle is within a threshold distance to at least one other vehicle;

responsively determining, based on the configuration parameters, a likelihood of interference between at least one sensor of the at least one other vehicle and the given sensor of the given vehicle; and providing, based on the likelihood being greater than a threshold likelihood, a request to the given vehicle to adjust given configuration parameters of the given sensor to reduce the likelihood of interference between the given sensor of the given vehicle and the at least one sensor of the at least one other vehicle.

20. The method of claim 19, wherein the given configuration parameters include one or more of a direction of the given sensor, a power of the given sensor, or a modulation pattern of the EM radiation transmitted by the given sensor.

* * * * *